Nov. 29, 1927.

J. RUMORE 1,651,294

BATTERY TERMINAL

Filed April 9, 1926

INVENTOR.
Joseph Rumore,
BY Geo. F. Kimmel
ATTORNEY.

Patented Nov. 29, 1927.

1,651,294

UNITED STATES PATENT OFFICE.

JOSEPH RUMORE, OF BESSEMER, ALABAMA.

BATTERY TERMINAL.

Application filed April 9, 1926. Serial No. 100,918.

This invention relates to storage battery cable connectors.

The primary object of this invention is the provision, in a manner as hereinafter set forth, of a device adapted to quickly and easily connect the terminal of an electric cable to a storage battery terminal post.

Still another object of the invention is the provision, in a manner as hereinafter set forth, of a connector device designed to form and maintain under all conditions a positive electrical connection between the end of a cable and the connecting post of a storage battery cell.

The invention contemplates the provision of a pair of elongated relatively flat members each terminating at one end in an annular member and having their other ends pivotally connected together. Each of the members carries an upstanding lug one of which lugs is formed to provide a socket designed to receive one end of an electric cable. Between the lugs carried by the members there is mounted a coil spring each end of which is connected to the adjacent lug. When the device is to be used, one end of the cable is secured in the socket provided therefor and the members are swung together in superposed relation compressing the spring positioned between the lugs and bringing the annular members into alignment. The aligned annular members are then placed over the terminal post of a battery to which the cable is to be connected and the members released. The expanding action of the spring will tend to cause the members to swing apart thus causing them to bite into and securely engage the battery post.

Another and final object of the invention is the provision, in a manner as hereinafter set forth, of a battery cable connector of simple, strong and durable design, easy to attach or remove, adapted to set up a positive and permanent electrical connection between a cable and battery post, and comparatively inexpensive to manufacture.

The invention will be best understood from a consideration of the following detailed description taken in connection with the accompanying drawing forming a part of this specification, with the understanding that the invention is not confined to any strict conformity with the showing of the drawing but may be changed and modified so long as such changes and modifications mark no material departure from the salient features of the invention as expressed in the appended claims.

In the drawing:—

Figure 1:
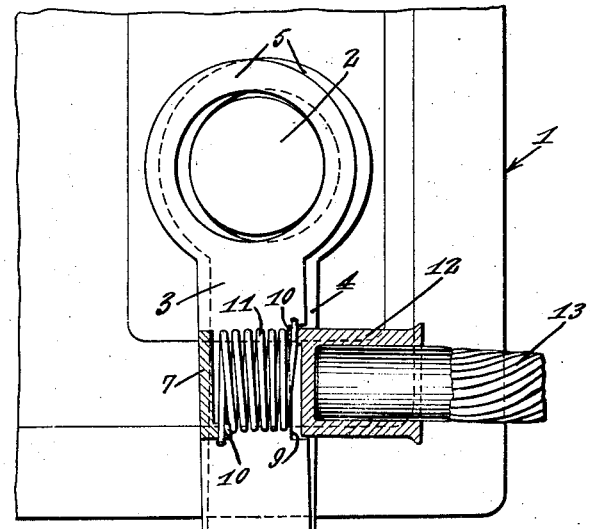
Figure 1 shows the device embodying this invention in top plan view and as connected between a battery terminal post and one end of an electric cable.

Referring now to the drawing in detail wherein like numerals of reference indicate corresponding parts throughout, there is indicated by the numeral 1 a corner portion of a storage battery, showing the cell terminal post at 2.

The connector embodying this invention comprises a pair of elongated relatively flat members 3 and 4, respectively, one end of each of which terminates in the annular member or head 5. The other free ends of the members 3 and 4 are placed one above the other and pivotally secured together by means of a securing screw 6 or other appropriate means.

The members 3 and 4 carry upon their upper sides intermediate the ends thereof and at the outer edge, the upstanding ears 7 and 8, respectively, these ears being so positioned as to be brought into side opposed relation when the members 3 and 4 are swung together into superposed relation as shown in Figure 1. The member 8 has its inner edge provided with the recess 9, in which the ear 8 takes its position when the arm members 3 and 4 are swung together as above described.

Each of the ears 7 and 8 has formed upon its inner face, the apertured lugs 10, the lug upon the ear 7 being located at the rear edge thereof and the lug upon the ear 8 being located at the front edge.

Figure 2:
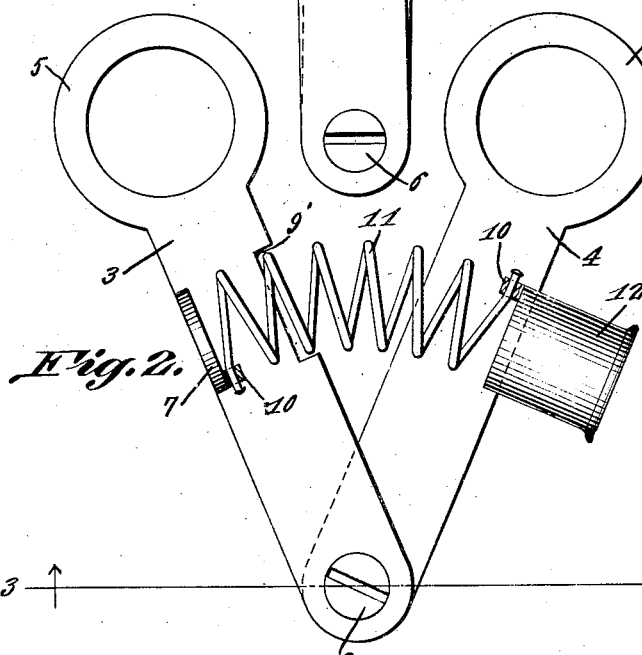
Figure 2 is a plan view of the connector removed from the battery and showing the members thereof in open relation.
Figure 3:
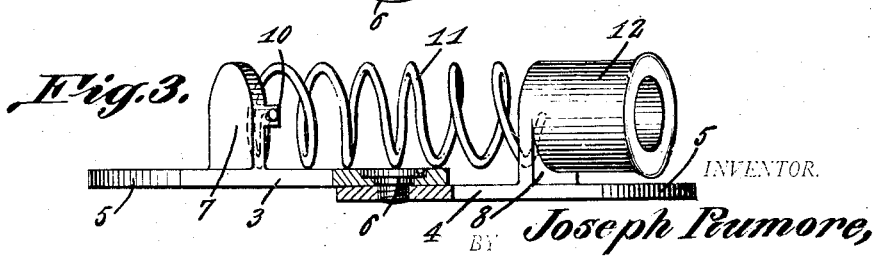
Figure 3 is a transverse section taken upon the line 3—3 of Figure 2.

Positioned between the ears 7 and 8 and having each extended through and secured to an adjacent lug 10, is a coiled spring 11. As is clearly shown in Figure 2 the action of this spring is to force the members 3 and 4 apart and the spring is therefore compressed or placed under tension as shown in Figure 1 when the members 3 and 4 are swung together or in superposed relation.

Secured to or forming a part of the ear 8 and extending from the outer face thereof, is a socket member 12 adapted to receive in the open end thereof the terminal end of an electric cable 13. The cable, after having the end inserted in the socket, may be soldered or otherwise appropriately secured therein.

In the use of the connector member embodying this invention, the members 3 and 4, after the cable 13 has had the end thereof secured in the socket member 12 as shown in Figure 1, are swung together into superposed relation as shown in Figure 1 thus bringing the apertures of the annular members 5 into aligned position. The aligned members 5 are then placed over the battery terminal post 2 and the members released. It will be readily seen that the expansion of the spring 11 will tend to cause the members 3 and 4 to swing apart which action will be hindered by the battery post 2 extending through the annular members and the battery post will therefore be bound securely between the members 5 with which a positive electrical connection will be made. It will be readily seen that the members 5 will bite into each side of the terminal post 2 so that dirt and corrosion will not be able to get between the connector and the terminal post thus ensuring a good electrical connection at all times. It will also be obvious that in order to disconnect the cable 13 from the battery 1 it will only be necessary to compress the members 3 and 4 to cause them to release their grip upon the terminal post 2 whereupon the annular portions 5 of the members can be readily removed from the post.

Having thus described my invention what I claim is:—

1. A battery post cable connector comprising a pair of rigid pivotally connected members having eyes adapted to grip a battery terminal post, and a laterally extending socket element carried by and rising from one of said members for securing an electric cable therein.

2. A battery terminal post cable connector, comprising a pair of elongated superimposed members each having an annular head at one end thereof, designed to grip a terminal post, a pivot in the other ends of each of said members and swingingly connecting the same together, means for causing said annular heads when moved to superimposed relation to grip a battery terminal post when extended therethrough, and a socket element extending laterally from one member for connecting an electric cable to one of said members.

3. A device of the character described, comprising a pair of superimposed flat elongated levers each pivotally connected at one end and having an eye at its other end, a socket member supported above and laterally projected from one lever intermediate its ends to receive the terminal of an electric cable, an ear rising from the other lever and confronting the socket member, and a coiled expansion spring between the ear and member and having its extremities anchored therein.

In testimony whereof, I affix my signature hereto.

JOSEPH RUMORE.